United States Patent [19]

Krivec et al.

[11] 4,059,180
[45] Nov. 22, 1977

[54] ROLLER ASSEMBLY WITH IMPROVED MOUNTING MEANS

[75] Inventors: Bert Krivec, Brookfield; Elwood B. Brown, Cedarburg, both of Wis.; Warren S. Raynor, Danville, Ky.

[73] Assignee: Rexnord Inc., Milwaukee, Wis.

[21] Appl. No.: 746,916

[22] Filed: Dec. 2, 1976

[51] Int. Cl.$^2$ ............................................. B65G 39/00
[52] U.S. Cl. ....................................... 193/37; 308/20
[58] Field of Search .............. 193/35 R, 37; 198/780, 198/842; 308/20; 29/116 R; 85/63, 72–78, 80, 82, 83, 84

[56] References Cited

U.S. PATENT DOCUMENTS

| | | | |
|---|---|---|---|
| 1,993,519 | 3/1935 | Miltenberger | 193/35 R |
| 3,164,054 | 1/1965 | Biesecker | 85/84 X |
| 3,353,644 | 11/1967 | McNash et al. | 193/37 |
| 3,739,684 | 6/1973 | Vitkevich | 85/73 |

FOREIGN PATENT DOCUMENTS

| | | | |
|---|---|---|---|
| 1,340,317 | 9/1963 | France | 193/37 |
| 2,251,573 | 5/1974 | Germany | 85/84 |
| 1,357,264 | 6/1974 | United Kingdom | 193/37 |

Primary Examiner—Evon C. Blunk
Assistant Examiner—James L. Rowland

[57] ABSTRACT

An improved mounting means for the rollers of a roller conveyor apparatus comprising a tubular bushing having a body portion which extends through the polygonal-shaped holes in the adjacent support structure into the polygonal-shaped shaft opening or bore of a bearing assembly sitted within the end of a roller and a tubular pin having a shaft portion extending through the bushing. The bushing has longitudinal slots running from the remote end along the body portion forming a plurality of resilient members and internal radially extending knobs on the resilient members. The circumference of the bushing is sufficiently large within the bearing shaft opening to prevent rotational motion of the contacting element in the bearing assembly. The pin has a complimentary groove circumferentially disposed about the shank portion near the remote end which causes the knobs and therefore resilient members to expand outwardly against the bearing assembly when the pin is fully inserted into the bushing. The expansion of the resilient members prevents retrograde motion of the bushing and pin and also creates an additional frictional constraint against rotation.

4 Claims, 7 Drawing Figures

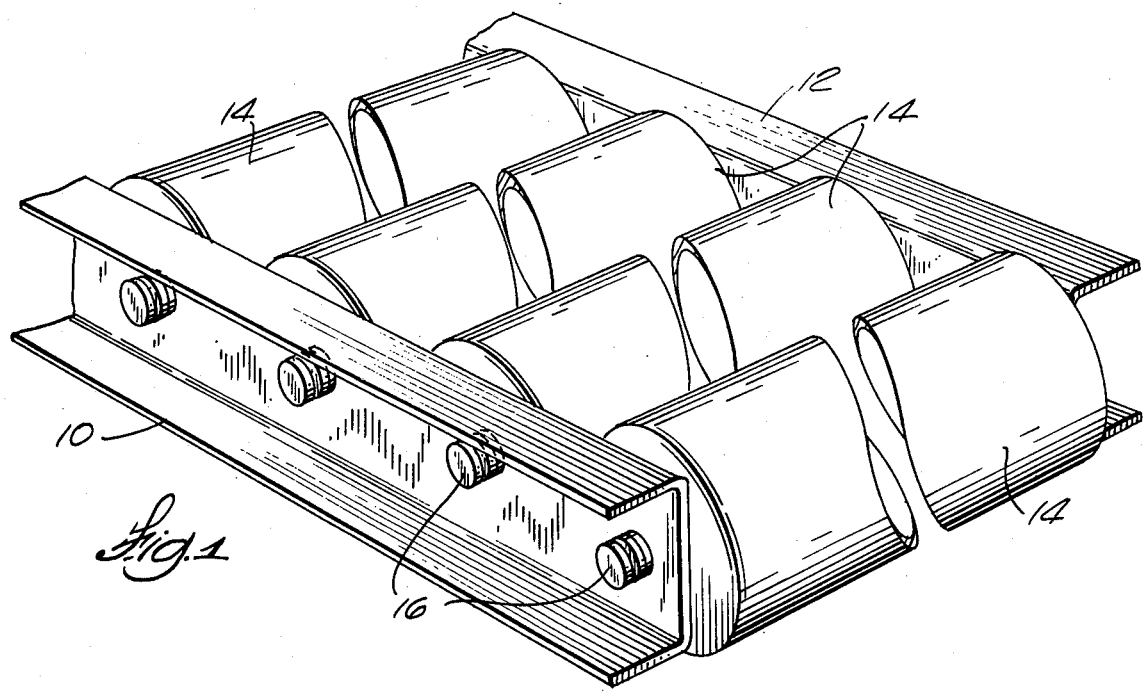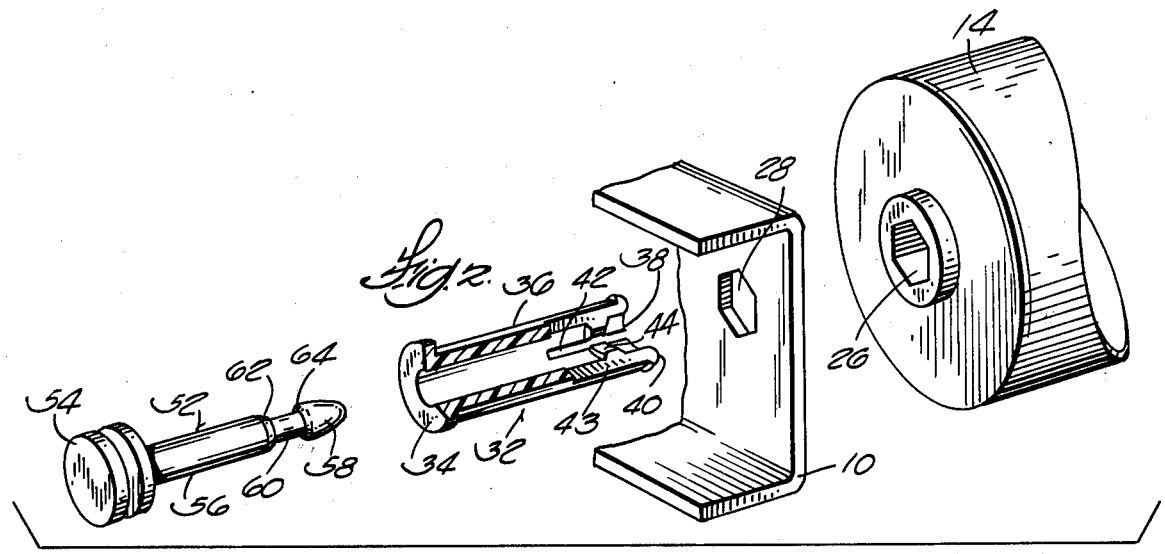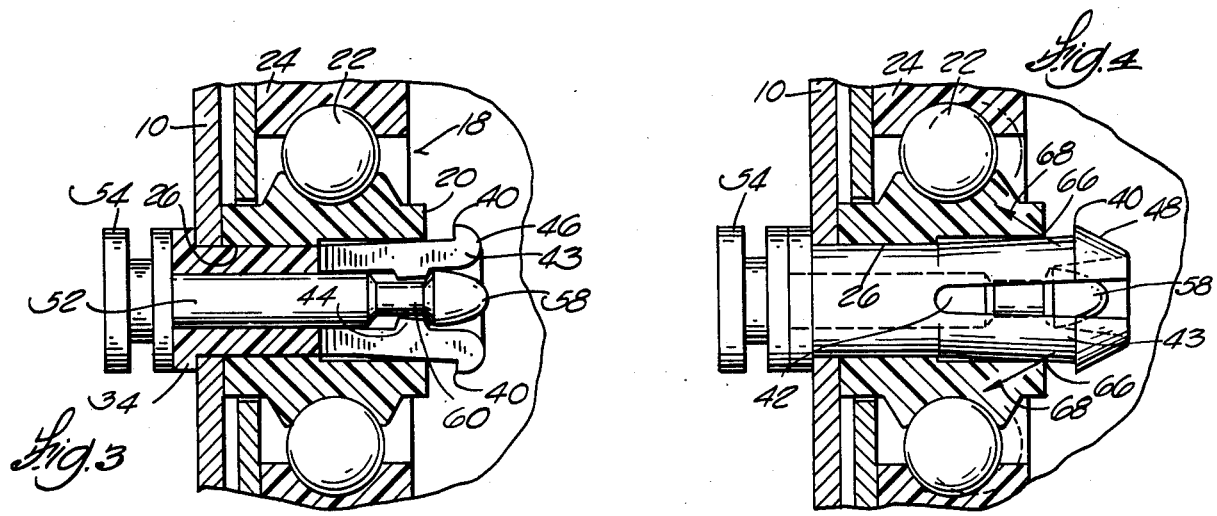

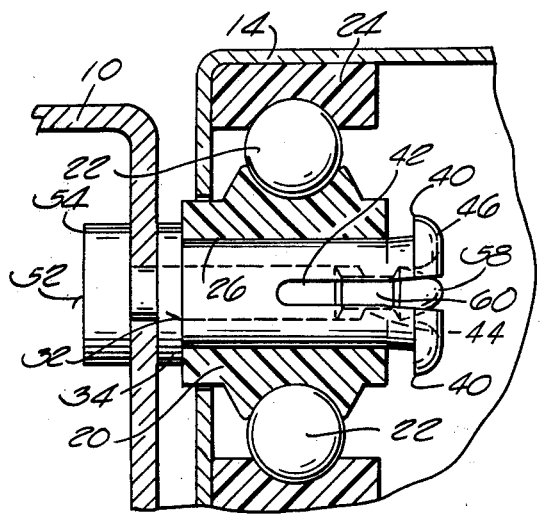
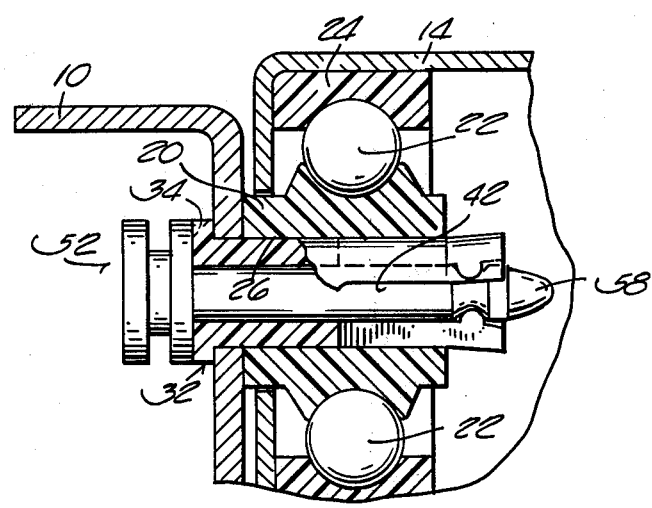
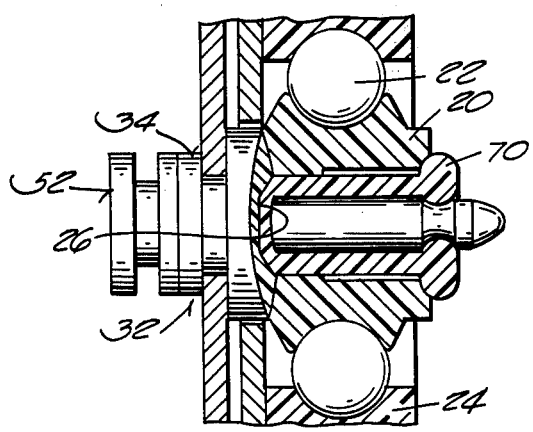

ROLLER ASSEMBLY WITH IMPROVED MOUNTING MEANS

FIELD OF THE INVENTION

Ths present invention relates to improved mounting means for rollers in a conveyor roller apparatus.

BACKGROUND OF THE INVENTION

The current state of the art with respect to supporting the ends of rollers in apparatus of the conveyor roller type is, in the main, devoted to the use of hexagonal shaped shafts which extend through the bearing assemblies mounted in each end of the roller and through holes in the adjacent support frames. The bearing assembly shaft opening and support frame holes also have hexagonal cross-sections which serve along with the shaft to prevent rotation of the bearing element, i.e., bearing cone, around which the spherical bearing members are disposed.

Polygonal shaped shafts are simple in design and certainly perform a useful function. There are, however, various drawbacks to the assembly and operation of the completed apparatus using a polygonal shaped axis. One serious problem is the difficulty in aligning the various openings and holes during assembly. The present mode is to manually align the shaft through one bearing assembly mounted at one roller end and the other bearing assembly whch is not mounted, and thereafter position the other bearing assembly within the other roller end. It is evident that such assembly is time consuming and therefore costly. When it is necessary to remove a single roller or part, the entire roller apparatus ordinarily must be disassembled.

it is with such problems in mind that it became a paramount objective of the present invention to eliminate the need for a hexagonal axle and its attendant disadvantages while maintaining its advantages.

SUMMARY OF THE INVENTION

According to the present invention, roller conveyor apparatus is provided with an improved mounting means for mounting the rollers for rotation. In general, the apparatus is comprised of spaced opposing support structures, a plurality of spaced rollers positioned between opposing support structures, a bearing assembly associated with each end of the roller for permitting a substantially friction free rotation of the roller, and a support means associated with each roller end for supporting each associated bearing assembly.

In one embodiment of the present invention, the mounting means includes a tubular bushing with a flanged head and a body portion which extends through a polygonal, or noncircular hole or a hole having raced walls in the support structure adjacent the roller and into a similarly shaped shaft opening in the bearing assembly. The external diameter of a body portion is such that it fits tightly in both the support structure hole and shaft opening. Due to the tightness of the fit in the aperture, the bushing is rigidly constrained against rotational motion and imparts the same constraint to the walls of the shaft opening.

A mating pin extends through the bushing and has a circumferential groove adjacent its "remote end". For purposes of this disclosure, "remote end" is defined as the end of the pin or bushing within the confines of the roller circumference as opposed to the "head end" which is preferably on the opposite side of the support structure or, at the very least, in close proximity.

The tubular bushing has a resilient region adjacent its remote end which in one instance permits ready insertion of the bushing through the support aperture and shaft opening. The resilient region provides for a decrease in tube cross-section as it is being inserted through the support structure and bearing assembly and a return to its original size thereafter.

In one variation, the resiliency of the region emanates from a plurality of longitudinal slots adjacent the bushing remote end which itself may be tapered to facilitate ready insertion. The openings form a plurality of resilient members. The internal diameter of the bushing tube between the openings has one or more extensions or knobs, generally circumferential disposed, which fit within the groove of the pin. The reduced diameter of the pin within the groove and the length of the knobs cause the walls of the resilient region, i.e., resilient members, to flex out, increasing the cross-section of the bushing.

The increased bushing cross-section provides for two paramount beneficial functions. First, the bushing and therefore the pin is effectively constrained against "retrograde longitudinal motion", i.e., movement of the bushing and pin in a direction toward the frame structure. Both are locked into place. Second, because of the outward flex of the walls of the bushing, which at the internal mouth of the shaft opening is strongly urged against and about the wall of the bearing assembly, the bearing assembly is provided load distribution along the entire inserted length of the bushing. Additionally, the abutting pressure provides increased frictional resistance against rotational motion by the bearing assembly member contacting the bushing. It should be also evident that it is only necessary to remove the bushing at the ends of the roller when it is desired to remove the roller itself.

There are many other beneficial functions and advantages of the present invention which will be readily evident having read the following detailed description and appended drawings.

BRIEF DESCRIPTION OF THE DRAWINGS

FIG. 1 is a perspective view of part of a roller assembly apparatus showing the head ends of the improved mounting means.

FIG. 2 is an exploded perspective, partly in cross-section, of the mounting means comprising a pin, bushing, a hexagonally-shaped openings in the support structure and rollers forming part of the present invention.

FIG. 3 is a partial cross-sectional view of one embodiment of the present invention taken along the longitudinal axis of the bushing and bearing assembly.

FIG. 4 is a diagrammatical cross-sectional view of the bearing assembly similar to FIG. 3 showing the interaction of various forces acting upon the various elements.

FIG. 5 is a cross-sectional view similar to that of FIG. 3 depicting another variation of the present invention.

FIG. 6 is a cross-sectional view similar to that of FIG. 3 depicting still another variation of the present invention.

FIG. 7 is a cross-sectional view similar to that of FIG. 3 depicting a further variation of the present invention.

In FIG. 1, a roller apparatus of very simple design is depicted in perspective. A pair of spaced support rails 10, 12 support a plurality of rollers 14. The rollers 14 are rotatably mounted to support rails 10, 12 by mounting means 16 as generally shown. Rollers 14 collectively provide a surface over which objects may be transported. For purposes of this disclosure, it does not matter whether the objects are moved manually, by gravity in the case of an inclined apparatus, or by rotative motion of the rollers powered by an external member such as a belt or a chain drive.

In FIG. 2, one embodiment of the present invention is depicted in an exploded perspective. Roller 14 is illustrated as having a hub or bearing assembly 18 about which the roller rotates. Bearing assembly 18 has a bore or shaft opening 26 which has a hexagonal cross-section extending part way into the bearing assembly 18. Thereafter, the cross-section may be generally circular. (This particular feature can best be observed in FIGS. 3 or 4.) The support rail 10 has a hole 28 also with the hexagonal cross-section.

It should be understood that the roller mounting means of this invention is particularly adapted for use in any roller conveyor assembly where the shaft and support frames use shaft openings of a noncircular or polygonal cross-section. However, circular openings may be used where the mounting means is expanded therein for a tight fit as described elsewhere in the description. In noncircular applications, it is only necessary that the tubular bushings (and in some instances the pins) have spaced surface area linear contacts with the walls of the opening. Various cross-sections may be employed, but for purposes of this description, the commercially employed hexagonal shape is used as an example of a noncircular shape.

While a typical bearing assembly 18 may be seen in FIG. 3, it should be understood that the present invention may be employed with other bearing assemblies and hub-like members as well. For example, the mounting means could be used with bearings of the journal type. However, for purposes of this description, the typical assembly comprises a bearing cone 20 which forms the member through which the shaft opening 26 extends and a plurality of spherical bearings 22 sealed by usual means between cone 20 and upper bearing member 24 attached to the end of roller 14.

A tubular bushing 32 having a head end 34, a body portion 36, and a remote end 38, is shown broken away, displaying the interior structure. In the preferred embodiment bushing 32 has a plurality of longitudinal slots 42 as best seen in FIG. 4 which divide the bushing into a plurality of resilient members 43. The wall of bushing 32 has increased thickness extending internally in a narrow circumferential band on resilient members 43 forming knobs 44.

The diameter of the body portion 36 is sufficiently large to provide for a tight fit within the rail support holes 28 for purposes to be described in more detail below. Generally, the diameter should be equal to or preferably slightly greater than the diameter of a circle circumscribed by the hexagonal cross-section of the rail holes 28 and the bearing shaft opening 26. Head end 34 has a diameter sufficiently large to prevent entry into rail hole 28. Remote end 38 may be rounded or tapered, respectively, as in region 46 seen in FIG. 3 or in region 48 seen in FIG. 4 as described to facilitate entry.

Additionally, a plurality of externally projecting knobs 40 circumferentially extending about the outside diameter of remote end 38 may also be used to facilitate insertion of the bushing 32 and, in some instances, serve as a locking feature.

The external knobs 40 which may be extensions of the taper at the remote end 38 of bushing 32 allows bushing 32 to be more easily inserted, particularly through the length of the shaft opening 26. Knobs 40 cause the resilient region or members 43 to flex inwardly and away from the sides of opening 26. As bushing 32 is inserted, it can be imparted a rotative motion to, in effect, screw bushing 32 into opening 26. To further facilitate the screw-like insertion or removal of bushing 32, the knobs 40 may be formed eccentrically about the bushing axis. Such a feature, however, is not critical and may be eliminated as seen in the structure illustrated by FIG. 6.

Pin 52 has a double head end 54 which facilitates removal when appropriate and a cylindrical shank portion 56 which is rounded at and/or tapered toward remote end 58. Both shank portion 56 and the interior wall of bushing 32 may be tapered to further facilitate tightness within shaft opening 22 and support hole 18. Adjacent remote end 58, shank 56 has a narrow neck of reduced thickness or groove 60. The walls 62, 64 of groove 60 are preferably tapered inwardly toward the groove to permit the insertion and removal of bushing knobs 44 as discussed below.

The materials from which bushing 32 and pin 52 can be fabricated are varied. Examples are nylon, polyethylene, rubber, urethane, and glass reinforced polyethylene. The glass reinforced polyethylene is considered a preferred material due to its strength, durability, and suitablity for use in injection molding processes. In some instances, particularly when supporting the full weight of the roller and bearing against or for very heavy loads, it is preferable to use a metallic pin. In most instances, however, the pin and bushing may be fabricated from identical materials and at the same instant during the molding process. This is easily done by having the pin and bushing molded in a telescoped arrangement and integral by virtue of a thin, easily breakable piece extending between the pin remote end and bushing head.

The remote end 38 of bushing 32 can be inserted in any rotative position about the longitudinal axis into shaft opening 26 and support hole 28 as opposed to hexagonal shaft which must be properly aligned. Because of the diameter of bushing 32, small portions of its surface adjacent the flat surfaces of the hexagon walls are flattened or self-machined, thus increasing the surface area contact between the external wall 33 of bushing 32 and internal walls of shaft opening 26 and support hole 28 respectively. The plurality of surface area contacts prevents rotation of bushing 32 within support hole 20 and imparts this constraint to bearing cone 20 through similar surface contacts within shaft opening 26.

Entry of bushing 32 into opening 26 and hole 28 is facilitated by the tapered end 38 and the longitudinal openings 42 extending from the remote end 38 toward head end 36. This resilient region of bushing 32 readily compresses upon entry and springs back to its normal dimension once having cleared the opening 26. Pin 52, however, causes the resilient region to expand once more beyond its normal cross-sectional area due to the interaction between knobs 44 and groove 60. To cause the flexing of the walls of bushing 32, it is necessary that the depth of groove 60 be less than the extension of knobs 50.

FIGS. 3 and 4 depict the instance where shaft opening 26 has a hexagonal cross-section at its entry but becomes circular midway toward its exit. As can readily be imagined, the gap between the wall of the bearing cone 20 and bushing 32 in an unflexed state would permit support of the inner bearing cone only above the hexagonal cross-section portion of opening 26. As seen in phantom in FIG. 4, bearing ball 22 is improperly aligned with the groove of bearing cone 20. This is due in part to improper loading caused by lack of support across the entire base of bearing cone 20 and the initial insertion of bushing 32 int shaft opening 26. Small misalignments of the bearing ball 22 are frequently responsible for significant wear and consequential reduced life time for the bearing assembly.

The flexing of the resilient region of the bushing 32 causes the bushing external surface to contact the bushing along a line through points 66 extending circumferentially around opening 18 at its mouth. A force denoted by arrows 68 places bearing 22 in its desireable position within the groove of bearing cone 20. Additionally, the load of cone 20 is distributed more evenly over the whole inserted length of bushing 32. The proper position and load distribution are significant contributors to a longer bearing assembly life.

Another advantage over using the support structure of the present invention is its capability of preventing "flare-out" of the support structure. In prior art structures utilizing hexagonal shafts or the like, the shafts extend from one side of the roller to the other and are supported by the paired support structures, usually two parallel rails. As heavy loads pass over the "surface" presented by the rollers, a component of the downward acting load force causes the support rails to bow or flare outward. This is particularly evident toward the midpoint between any cross-members securing the two rails. The only effective means of preventing such is through the use of a cotter pin or similar devices through the shafts located outboard of the support rail. This obviously increases manufacturing expense.

By utilizing the improved support structures of the present invention, flare-out is effectively eliminated. Each individual mounting means can withstand a high outward-acting force acting in a direction toward the head ends of bushing 32 and pin 52. It is readily apparent that through the distribution of the load over several rollers, the combined resistance against the outward acting force is sufficient to withstand considerable predetermined force.

FIG. 5 illustrates a different embodiment in which pin 52 provides the sole support of the bearing assembly and roller end. Pin 52 then acts as the sole constraint against rotation of bushing 32 and inner cone 20. For openings 26 and holes 28 of the same dimension, the shank 56 of pin 52 must have a reduced diameter within bushing 32.

FIG. 7 depicts still another embodiment limited to uses where bushing 32 and pin 52 are manufactured for use with a particular bearing assembly width. In this embodiment, remote end 38 has a wall portion of increased thickness forming circumferential knob 70 extending both internally and externally. The length of the bushing is such that the outer ridge of knob 70 is in close proximity to the base wall of inner bearing cone 20 forming the mouth of opening 20. When pin 52 is inserted, the intersection between the shallow groove 60 and the inner ridge of knob 70 causes knob 70 to forcefully press against cone 20, providing the proper support to cone 20 all along its base.

Although the description has been limited to particular embodiments of the present invention, it is thought that modifications and variations would be obvious to one skilled in the art in light of the above teachings. It is understood, therefore, that changes may be made in the features of the present invention described herein which fall within the full intended scope of the invention as defined by the following claims.

We claim:

1. In combination, a roller conveyor apparatus having an improved mounting means for attaching the rollers to support structures comprising:
   a. Spaced support structures having a non-circular support shaft holes;
   b. a plurality of spaced rollers positioned between the support structures;
   c. hub means attached to and associated with each roller end for providing a hub about which each roller can rotate, each hub means having a shaft opening having a non-circular cross-section along at least a first portion adjacent said support structures;
   d. mounting means associated with each hub means for supporting each hub to adjacent support structure comprising:
      1. an elongated tubular member of elastomeric material having a head end and a body portion which extends through said shaft hole, said body portion having a plurality of essentially longitudinal slots extending from the remote end thereof into said shaft opening and a plurality of inwardly and outwardly extending knobs between the longitudinal slots, said body portion having an outside diameter sufficiently large to provide for a flattening of the outer surface against the flat walls of said shaft hole and first portion of said shaft opening when said tubular member is inserted into the shaft opening; and
      2. a pin means member of elastomeric material having a head portion and a shank portion which extends through said support hole and said tubular member, said shank portion having a groove which when the pin means is fully inserted is adapted to accept the inwardly extending knobs and is constrained against longitudinal movement relative to the tubular member by virtue of said knobs, said groove having a depth less than the length of said inwardly extending knobs to cause the walls of the tubular member abut the hub means along points around the remote end of said shaft opening thereby providing support to said hub means over substantially the entire inserted length of said tubular member.

2. The apparatus of claim 1 in which the head portion of the pin means abuts the support structure and the head end of the tubular portion is positioned between the support structure and hub means.

3. The apparatus of claim 1 in which the shaft opening has a circular cross-section along a second portion adjacent the remote end thereof, said body portion of said tubular member having an outside diameter which is spaced from the walls of the second portion when inserted into said shaft opening and flexes outwardly within the second portion when said pin means is fully inserted therein.

4. The apparatus of claim 3 in which cross-sections of the shaft hole and first portion of the shaft opening are hexagonal while the cross-section of a second portion of the shaft opening is circular and the diameter of the tubular member body portion being larger than the diameter of a circle circumscribed by the hexagonal cross-section of said support and shaft openings and smaller than the internal diameter of the second portion thereby being flattened along the surfaces in contact with the internal surfaces of the first portion when said tubular member is inserted into said shaft opening and being expanded within the second portion.

* * * * *

UNITED STATES PATENT AND TRADEMARK OFFICE
CERTIFICATE OF CORRECTION

PATENT NO. : 4,059,180

DATED : November 22, 1977

INVENTOR(S) : Bert Krivec; Elwood B. Brown; Warren S. Raynor

It is certified that error appears in the above-identified patent and that said Letters Patent are hereby corrected as shown below:

In column 1, line 29, [whch] should be which

In column 1, line 36, [it] should be It

In column 2, line 50 [a] should be and

In column 4, line 34 [against] should be assembly

In column 5, line 12 [int] should be into

In column 5, line 17 [bushing] second occurrence should be bearing

In column 5, line 67 [intersection] should be interaction

Signed and Sealed this

Nineteenth Day of December 1978

[SEAL]

Attest:

RUTH C. MASON
*Attesting Officer*

DONALD W. BANNER
*Commissioner of Patents and Trademarks*